Feb. 18, 1936. R. W. CHAPMAN Re. 19,856

METHOD OF AND MACHINE FOR MAKING PULP ARTICLES

Original Filed Nov. 20, 1926 5 Sheets-Sheet 1

INVENTOR
Ralph W. Chapman by Wright Brown Quinby & Mecy
Att'ys

Feb. 18, 1936. R. W. CHAPMAN Re. 19,856

METHOD OF AND MACHINE FOR MAKING PULP ARTICLES

Original Filed Nov. 20, 1926 5 Sheets-Sheet 2

INVENTOR
Ralph W. Chapman by Wright Brown Quinby & May
Att'ys.

Feb. 18, 1936. R. W. CHAPMAN Re. 19,856

METHOD OF AND MACHINE FOR MAKING PULP ARTICLES

Original Filed Nov. 20, 1926 5 Sheets-Sheet 3

INVENTOR
Ralph W. Chapman by Wright Brown Quinby & Ray
Att'ys

METHOD OF AND MACHINE FOR MAKING PULP ARTICLES
Original Filed Nov. 20, 1926 5 Sheets-Sheet 4
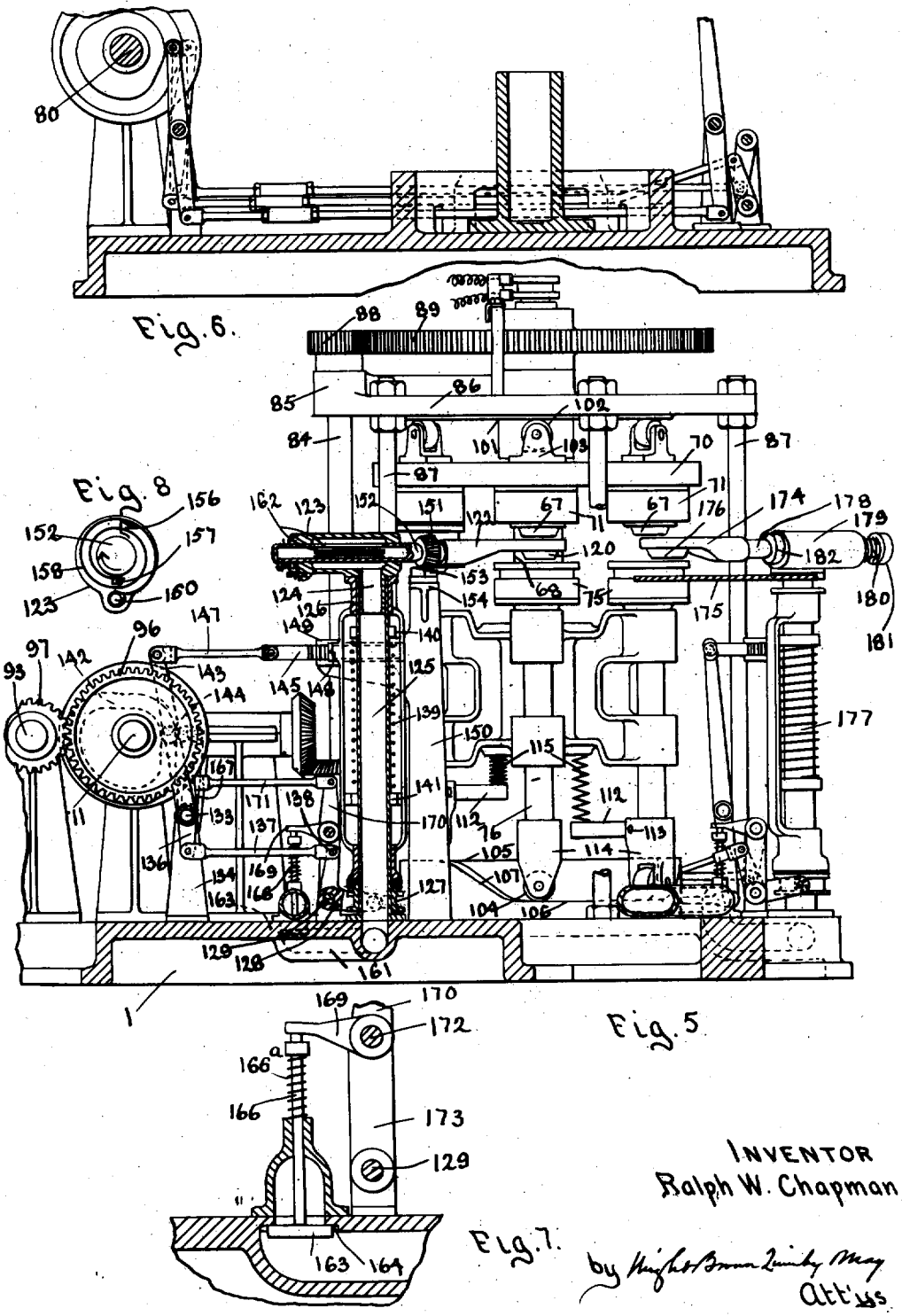
INVENTOR
Ralph W. Chapman
by Wright Brown Quinby & May
Att'ys Feb. 18, 1936. R. W. CHAPMAN Re. 19,856
METHOD OF AND MACHINE FOR MAKING PULP ARTICLES
Original Filed Nov. 20, 1926 5 Sheets-Sheet 5
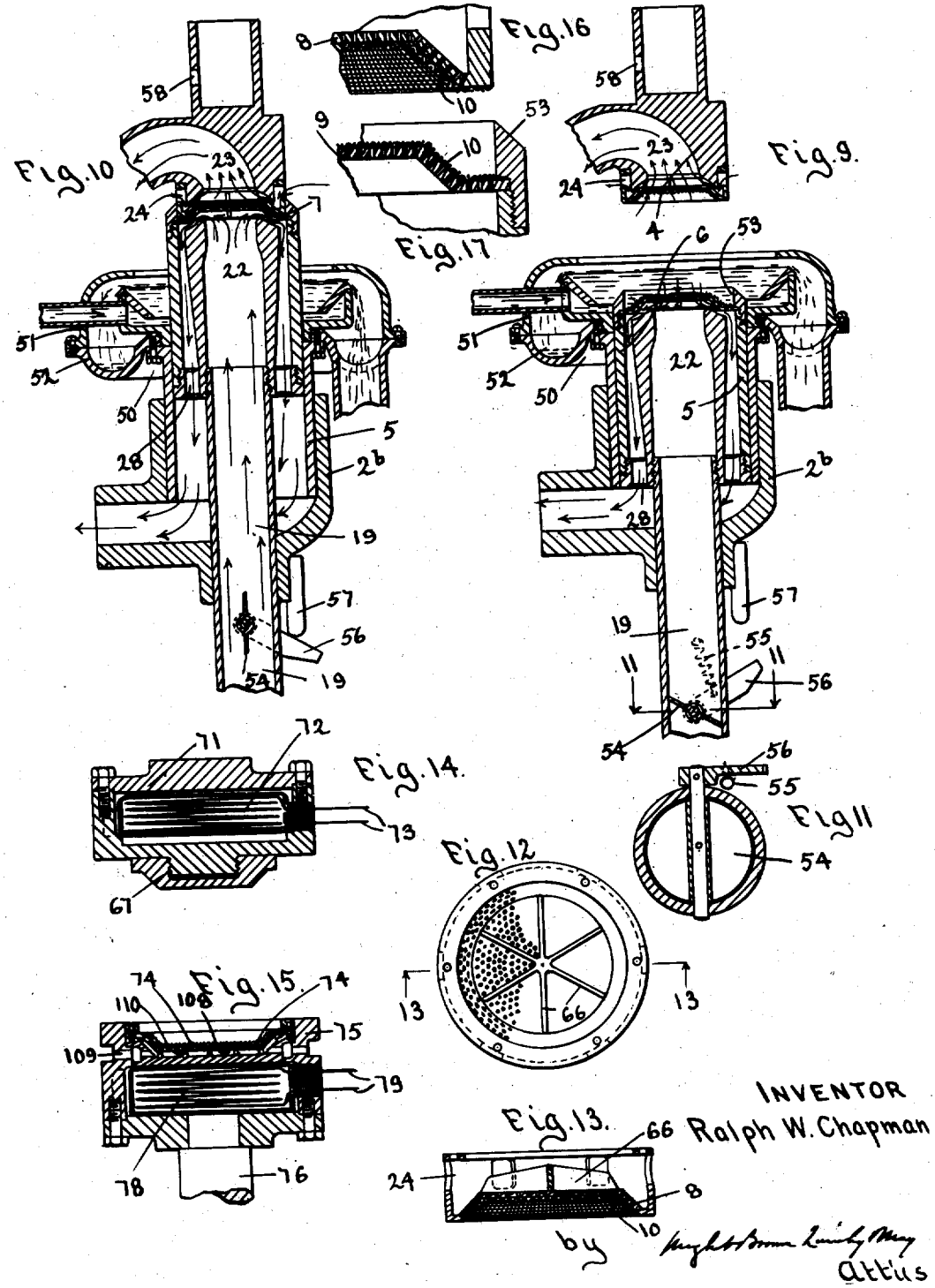
INVENTOR
Ralph W. Chapman
by Knight Brown & Mitchell
Attys Reissued Feb. 18, 1936 Re. 19,856

UNITED STATES PATENT OFFICE 19,856

METHOD OF AND MACHINE FOR MAKING PULP ARTICLES

Ralph W. Chapman, Old Town, Maine, assignor, by mesne assignments, to The Old Town Company, a corporation of Maine Original No. 1,778,934, dated October 21, 1930, Serial No. 149,627, November 20, 1926. Application for reissue October 15, 1932, Serial No. 637,996

31 Claims. (Cl. 92—59)

The general object of the invention is to provide a complete article of manufacture made from any suitable pulp, such as ground wood, the article, whatever its form and function, being characterized by a high degree of compactness and density, uniformity of shrinkage strains throughout its entire mass, freedom from liability to depart from its predetermined shape and thickness, hard and firm external surfaces, and other advantageous features which will appear hereinafter.

The accompanying drawings forming a part of the specification, show the preferred embodiment of a machine constituting the mechanical part of my invention, and adapted to practice the method hereinafter described and claimed.

In said drawings,—

Figure 5 is a vertical section of the machine on lines 5—5 of Figure 1;

Figure 6 is a vertical section of the lower part of the machine on lines 6—6 of Figure 1 showing the connections for operating the discharging picker;

Figure 7 is a sectional fragment, showing the picker air valve;

Figure 8 is an end view of the transfer picker arm, showing means for insuring that the arm will register with the forming mold;

Figure 9 is an enlargement of portions of Figure 4, showing the molding dies hereinafter described separated from each other;

Figure 10 is a view similar to Figure 9, showing the molding dies closed on a charge of pulp;

Figure 11 is an enlarged sectional plan on 11—11 of Figure 9;

Figure 12 is a top plan view of the upper molding die;

Figure 13 is a section on line 13—13 of Figure 12;

Figures 14 and 15 show enlarged views in section, of the finishing dies shown in Figure 3, and hereinafter described;

Figures 16 and 17 show enlarged fragments in section of the forming dies, shown in Figures 9 and 10, and hereinafter described.

The same reference characters indicate the same parts in all of the figures.

Figure 4:
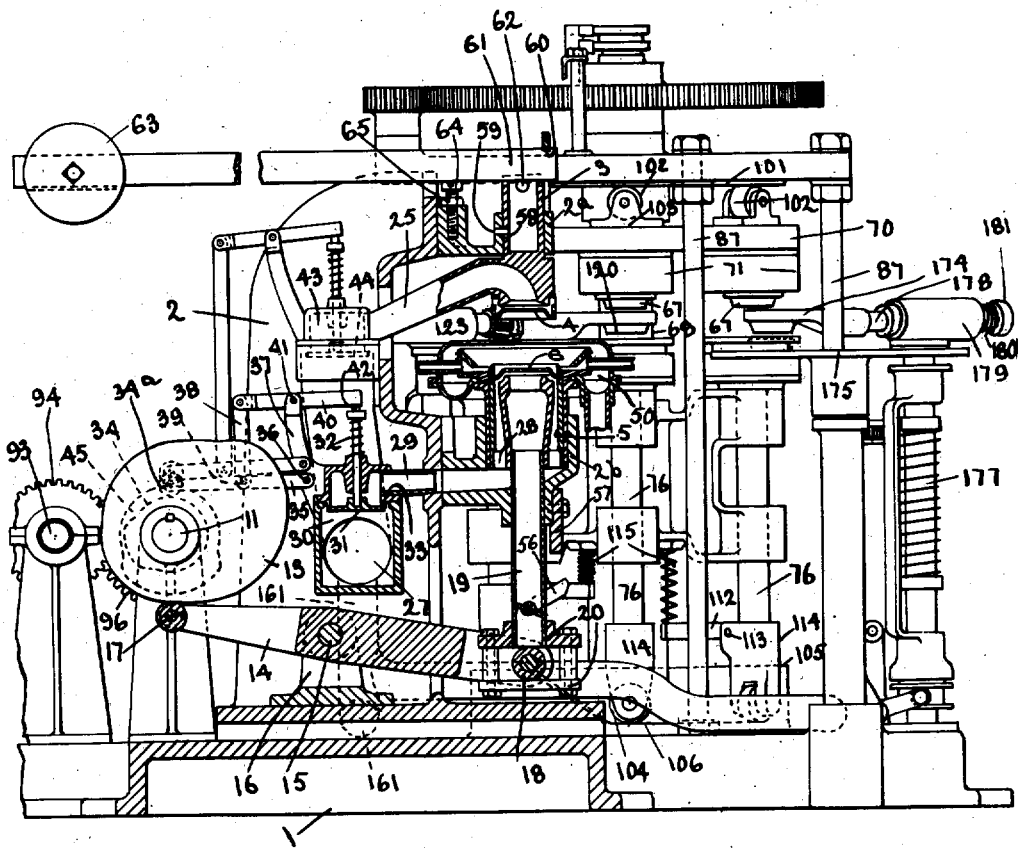
Figure 4 shows the machine in vertical section, on the lines 4—4 of Figure 1.

The frame of the machine includes a base 1, and a standard 2, projecting upward from the base, the standard being provided with upper and lower guides 2a and 2b (Figure 4).

Supported by the standard in the upper guide 2a and having a limited movement therein, is a head or holder 3, to which is secured a foraminous upper molding die 4. A carrier 5, movable in the lower guide 2b supports a foraminous lower molding die 6. The molding dies, shown enlarged in Figures 16 and 17, are formed to press a charge 7 of pulp, shown in solid black (Figure 10), to approximately its final form, and express water therefrom into and through the openings in the dies.

The dies are preferably composed, as best shown in Figures 16 and 17, of perforated metal forms 8 and 9, the forming surfaces of which are covered with a layer of wire gauze 10, the function of which is to prevent particles of pulp from passing through the relatively small openings in the gauze, while permitting the escape of surplus water through the perforations of the mold forms 8 and 9.

Power mechanism is provided to reciprocate the lower die 6, and cause its coaction with the upper die, said mechanism preferably including a drive shaft 11 (Figure 4), driven by an electric motor 12 (Figure 1) through suitable connections hereinafter described; a cam 13, fixed to the drive shaft, a rocker arm 14, fulcrumed at 15 on a stand 16 rigid with the base, and having at one end a trundle roll 17, engaging the cam, and at the other end trundle rolls 18, and a tubular rod 19, fixed to the lower die carrier 5, and having a yoke 20, engaging the trundle rolls 18. The carrier 5 is formed as a piston, of which 19 is the rod, the latter serving also as an air conduit.

The machine includes an air-conducting system, adapted to pass currents of air over the outer surfaces of the dies 4, and 6, to evaporate and remove the water expressed by the dies from the charge 7. Said system includes an air exhauster, which is capable of causing approximately six inches of vacuum, the casing of which is designated by 21 (Figures 1 and 3), located at any suitable point, more or less remote from the machine, and air conduits, each communicating at one end with the atmosphere, and at the opposite end with the fan casing, said conduits including lower and upper suction spaces 22 and 23 (Figure 10) associated with the dies 4 and 6, and formed in part by the outer sides of said dies.

For this purpose I prefer to use an ordinary suction fan instead of a vacuum pump, as there is a material saving in power required.

The conduit which includes the upper suction space 23, includes also an intake portion 24 (Figure 10), open to the atmosphere at the margin of the said suction space, and an exhaust portion 25, extending from the upper suction space 23 to the exhauster 21.

The conduit which includes the lower suction space 22, is a combined intake and exhaust conduit, and includes also the piston rod 19, which is tubular and open at its lower end to the atmosphere, and communicates with the suction space 22, so that it constitutes the intake portion. Passages 28 formed in the lower die carrier 5, and communicating with the lower suction space 22, are included in the exhaust portion of this conduit, and communicate with a fixed conduit portion, or section 29, which communicates with the exhaust conduit 27, in common with the upper suction space 23.

It will now be seen that the air-exhauster 21, which, as above stated, may be an ordinary suction fan, induces a flow of air currents across the outer sides of the molding dies, and that the described conduits may be proportioned to cause large volumes of air to thus flow, and rapidly evaporate and carry away the water expressed from the charge 7.

The intake portion comprising ports 24, nearly surrounds the upper suction space 23, so that the air is evenly distributed over the outer or back side of the upper die 4. Its cross sectional area is preferably about one-third smaller than that of the exhaust conduit section 25, so that suction is exerted on the charge 7 to hold the same in contact with the upper die, when the lower die recedes.

One of the conduit portions 30 of the exhaust conduit from the lower suction space 22 (Figure 4) is provided with a valve 31, closed on a seat 33 by a spring 32 and opened by means including a cam 34 on the drive shaft 11, a lever 35, fulcrumed at 36 on a fixed support 37, on which is mounted the trundle roll 34a bearing on the cam 34, a pitman, 38, pivoted at 39 to the lever, and one end of the rocker arm 40, fulcrumed at 41, on the fixed support 37, the other end of the arm 40 bearing on the stem 42 of the valve.

One of the conduit portions 43 of the exhaust conduit from the upper suction space 23, is provided with a valve 44, (Fig. 4) similar in character to the valve 31, and operated through similar connections by means of the cam 45 on the drive shaft 11.

The arrangement is such that the valves 31 and 44 are opened and closed alternately. When the upper valve 44 is opened, suction is maintained in the upper suction space 23, so that the charge 7 is held on the upper die, when the lower die recedes. The lower valve 31 is closed, when the lower die commences to recede, so that the lower die has no tendency to pull down the charge.

Attached to the guide 2b in which the lower die carrier or piston 5 reciprocates, is an annular pulp reservoir, preferably composed of a base portion 50 (Figure 10), having an upstanding annular curb 51, and a dished annular portion 52, supported by the curb above the base portion. The carrier 5 has a liquid-tight sliding fit in the base portion of the reservoir, and has an annular charge-segregating member 53, which is in the lower portion of the body of pulp held in the reservoir when the carrier is depressed. When the carrier rises, the member 53 segregates a circular charge of pulp on the lower die and raises it to the upper die, so that the charge is compressed and the expressed water is removed, as above described. When the carrier is rising to segregate the charge, a butterfly valve 54, in the bore of the rod 19, is closed by a spring 55, to prevent a flow of air through the rod to and through the suction chamber 22. When the lower die reaches its pressing position, the valve 54 is opened by contact of an arm 56, attached to its shaft, with a fixed stop 57, on the lower guide 2b so that an air current across the outer side of the lower die is permitted.

The holder 3 of the upper die 4, preferably has a limited vertical movement in the upper guide 2a, this being permitted by a slot 58 in the holder 3, and a stud 59, fixed to the guide 2a. The object of this is to permit an increased pressure on the charge 7, during the latter part of the pressing operation. To this end, the guide 2a is provided with a fulcrum 60, engaged by one end of a lever 61, which is caused to bear on a member 62, fixed to the holder 3, and exert downward pressure on the holder, when the latter is raised, the lever being provided with a weight 63, which may be adjusted to vary the pressure.

In case a relatively thin article is being formed, the weighted lever holds down the holder 3, and the upper die, throughout the entire upward movement of the lower die, but when a thicker article is desired, the pressing operation may be repeated, another charge being superimposed on one already pressed, and pressed by the weighted lever, which is raised and caused to act by the increased thickness of the charge. The arrangement may be such that two or more layers of pulp may be assembled and pressed to form a thick charge, the pressure on the charge occurring after the first layer has been pressed. The pressing action of the lever may be limited by an adjustable stop 64, preferably a screw engaged with a tapped socket in a fixed part of the frame, and provided with a lock-nut 65.

To prevent distortion or buckling of the molding dies, by the pressure exerted thereon, I provide bracing means, located in the suction spaces 22 and 23. The bracing means in the upper space 23 is shown by Figures 12 and 13, as a grid composed of radiating plates or arms 66, arranged edgewise to the direction of pressure, and bearing on the holder 3, and on the outer side of the upper die, the plates being thin, and spaced apart, so that they do not materially impede the flow of air through the space 23. The bracing means in the lower suction space 22, may be a similar grid, the arms 66 of which bear on the carrier 5, and the outer side of the lower die.

The charge 7 is dried by the operation described, to the extent permitted by the pressure on the charge and the evaporation of the expressed water by air currents, considerable residual water remaining in the charge and while the charge may be completely dried by exposure to the air or in an oven, when not under pressure, such drying is necessarily slow and leaves the charge rough and distorted or uneven.

To quickly complete the drying of the charge and convert it into a marketable article having the exact predetermined form desired and a smooth finished surface, I remove the molded charge from the molding dies, interpose it between forming or finishing dies, and subject it to heat while under pressure, as next described.

67 (Figure 14) designates an imperforate upper forming die, which is located adjacent the molding dies, and has a polished forming face complemental to one side of the molded charge 7, the die being preferably made of a suitable noncorrosive metal. The die 67 is preferably one of a circular series of similar dies, fixed to a rotary carrier which includes a vertical shaft 68, (Figures 1 and 3), rotatable in a fixed step bearing 69, and an upper carrier or spider 70, fixed to the shaft. The carrier is provided with holders 71, to which the dies 67 are fixed. The dies are heated, preferably by electric heating units 72, in the holders 71, connected through conductors 73 with a source of electric energy. 74 designates a foraminous lower forming die complemental to the upper die 67, and preferably composed, like the molding dies above described, of a layer of perforated sheet metal and a layer of wire gauze. This die is fixed to a holder 75, mounted on a rod 76, which is vertically movable in guides in a lower carrier or spider 77, fixed to the shaft 68. The lower die 74 is preferably one of a circular series of lower dies, each alined with an upper die 67. I prefer to heat the lower dies by heating units 78, in the holders 75, connected through conductors 79 with a source of electrical energy.

The shaft 68 is continuously rotated and in common with the shaft 11, is rotated through driving connections from the electric motor 12.

As hereinbefore stated, it is at times advisable to produce an article of extra thickness, and to do this, one or more charges of pulp are superposed on the primary formed article, and pressed to become homogeneous. As this must be done before the article is transferred to the drying unit, it is necessary for the forming unit to complete two or more cycles of action, while the drying unit completes one.

Figure 1:
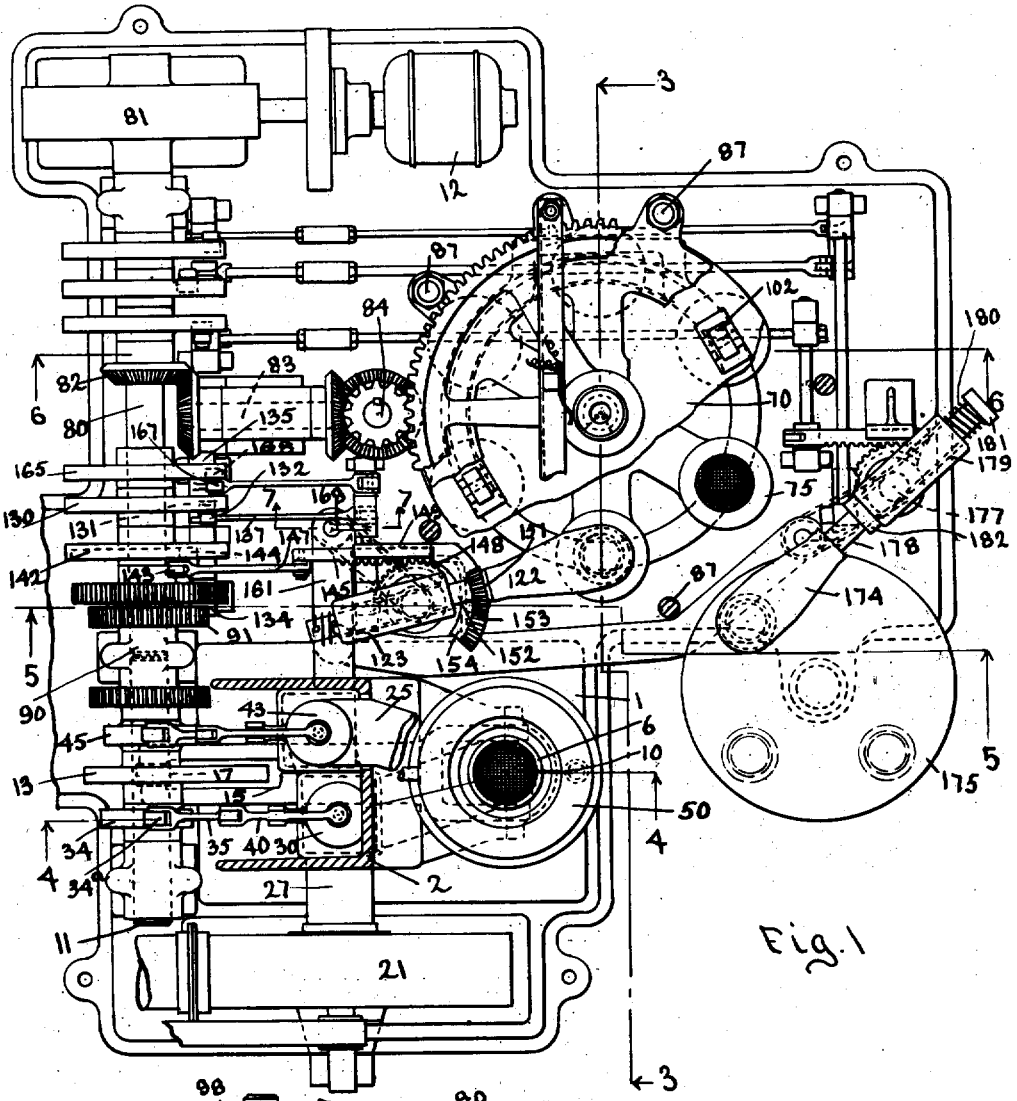
Figure 1 is a top plan view of the machine, partly in section on line 1—1 of Figure 3.

As the forming and drying units must coordinate in action, it is essential that they be operated from the same source of power, and in such manner that the thickness of the article produced may be varied, in the manner above stated. To this end, I provide the following means:

The electric motor 12 drives the shaft 80 through suitable means for reducing the speed of the shaft, which may be enclosed in the casing 81 (Figure 1). On this shaft is secured the mitre gear 82, transmitting power by means of similar mitres, through the shaft 83 to the shaft 84. This shaft is journaled at one end in a bearing secured to the base 1, and not shown, and near the upper end at 85, in a frame 86, which is supported by the posts 87, upwardly extending from the base 1. The pinion 88 is secured to the shaft 84 and meshes with the gear 89 rigid with the shaft 68, and by means of which the spider 70 and drying units are rotated. The speed of rotation of this spider is such that if the articles pressed are of single thickness, in each cycle a pressed article is transferred to one of the drying units by means hereinafter described.

Figure 2:
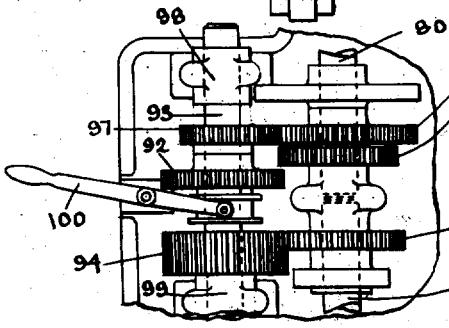
Figure 2 shows the mechanism for changing the relative rotation of the former and the drier units.

When two or more charges of pulp are superposed, a corresponding number of forming cycles must be completed before the pressed article is transferred to the drying unit, and the relative speeds of the pressing and drying sections of the machine vary accordingly. As both forms of articles are to be produced, I have shown in Figures 1 and 2 one form of mechanism which will permit the production of articles of either single or double thickness.

The axes of the shafts 11 and 80 are coincident, and when producing an article of single thickness, rotate in unison. Under this condition the gear 91 secured to shaft 80, meshes with a gear 92 of equal size on the counter-shaft 93, and through similar gears 94 on the counter-shaft, and 95 on shaft 11, the shaft 11 is rotated in unison with the shaft 80. If, however, two charges are imposed on the forming mold before transferring, I employ gears 96, secured to the shafts 80 and 97 on the counter-shaft retaining the gears 99 and 95 for transmission to the shaft 11.

The gears on the shaft 80 and the corresponding gears on the counter-shaft 93, are so spaced that when a change of speed is required, the shaft 93 may be slid endwise in the bearings 98, 99, by means of the shift lever, 100, for the purpose of releasing one pair of gears, and meshing the pair required to rotate the shaft 11, the gear 94 being made of sufficient width of face to permit remaining in mesh with the gear 95 on shaft 11.

It is obvious that gears of other proportions may be used in connection with those described, to give greater thickness of articles if required, in which case, a variation in details of construction only would be required to permit introduction of other gear couples, on the shafts 80 and 93.

Vertical movement of the upper dies 67 is prevented by a horizontal circular upper track 101, formed on the under side of frame 86, rollers 102 running on said track and journaled in bearings 103, fixed to the carrier 70. The rods 76, supporting the lower dies, are provided at their lower ends with rollers 104, bearing on an annular cam-shaped lower track, fixed to the base and including a raised portion 105, constituting the major portion of the track, and a depressed portion 106, connected with the raised portion by inclined portions 107. The rotation of the shaft 68 and carriers 70 and 77, causes the forming dies to revolve in unison about a common vertical axis.

The contour of the lower track is such that at a given point, each of the lower dies separates from the corresponding upper die and is depressed, the rollers 104 bearing on the depressed portion 106 of the track. At this time, the finished article is removed from the lower die by means hereinafter described, and a molded charge is transferred thereto, the other lower dies being at the same time supported by the raised portion 105 of the lower track, in a raised position to coact with the other upper dies.

When this die rises, the charge is pressed between the lower die and the corresponding upper die, the pressure being sufficient to materially decrease the thickness of the charge, and preferably, about fifty pounds to the square inch.

The forming dies are heated by the heating means, preferably to a temperature of approximately four hundred degrees F. or more. Contact of the highly heated imperforate die with the wet charge causes the water in the contiguous part of the charge to be raised to the boiling point almost instantaneously and to flash into steam, with generation of pressure which forces water in the liquid state from the balance of the charge through the foraminous die. A considerable proportion of the residual water in the molded article is expelled in this way before the entire charge is raised to the boiling temperature. Continued heating with further lapse of time converts the residue of moisture into the form of steam. Dependent on the length of time allowed for heating and the temperature and amount of heat supplied to the dies, the molded article may be brought to any desired degree of dryness.

Figure 3:
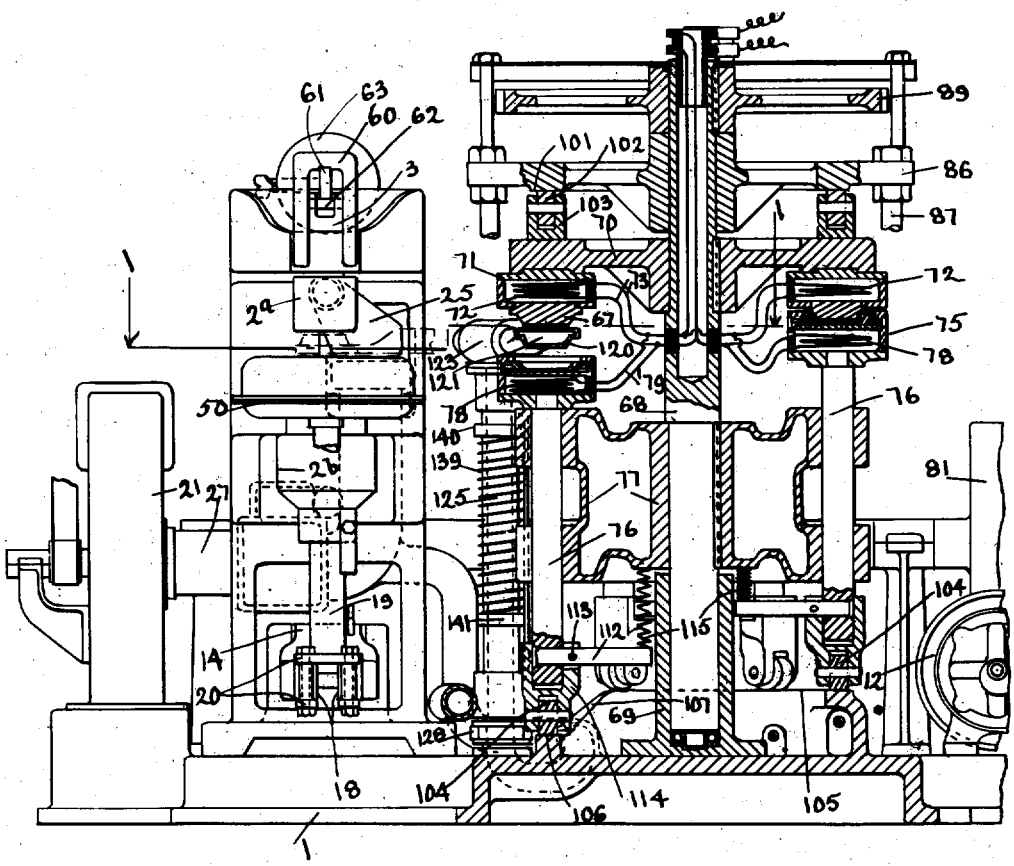
Figure 3 is a section on line 3—3 of Figure 1, parts of the machine being shown in side elevation.

The steam is prevented by the imperforate die 67 from escaping upwardly, and can escape only through the openings in the foraminous die 74. Said die forms one side of a steam space 108 (Figure 15), the opposite side of which is formed by a surface in the holder 75. The steam space is provided with numerous radial outlet ports 109, through which the steam escapes to the atmosphere. The lower die 74 is prevented from buckling under the pressure exerted upon it, by bracing means, which may be embodied in spaced apart projections or grid members 110, supported by the holder and supporting the lower side of the foraminous die. In case the lower forming die is heated, the projections 110 serve to conduct heat to the die. The transformation of the residual water into steam within the charge, causes voids therein, and the pressure is continued or followed up after the initial pressure is exerted, to close said voids and bond all of the fibers together within the charge, so that the strength of the finished article is materially increased. Figures 3 and 5 show means for following up the pressure or continuing the upward movement of the lower dies beyond the limit to which they are raised by the raised portion 105 of the lower track, said means being embodied in levers 112, fulcrumed at 113, to sockets 114, constituting terminals in which the rolls 104 are journaled, and in which the rods 76 are independently movable, and springs 115 interposed between the lower arms of the levers and the carrier 77. When a lower die 74 is depressed, as shown at the left in Figure 3, the spring 115 is expanded, and does not act to raise the die through the rod 76. When the die is raised, as shown at the right in Figure 3, the spring is compressed and acts through the lever 112 to exert upward pressure on the rod 76, whereby the voids in the charge under pressure are closed, and the charge is suitably compacted.

The imperforate upper die 67 seals the upper side of the charge, so that no steam escapes therethrough. The expelled water and steam passes only through the foraminous lower die and to the atmosphere. I have found that if the steam were allowed to escape simultaneously through both sides, the charge would be seriously ruptured. By confining the steam between the upper surface of the charge and the polished face of the upper die 67, a glazed surface similar to that of high grade calendered paper is imparted to the upper side of the charge. The pressure must not be released until all of the residual water is removed from between the sides of the charge.

The charge is now a finished article and is removed from between the forming dies, as hereinafter described, and exposed to the atmosphere while it remains heated, so that any traces of moiture remaining on the article, and particularly on the calendered or glazed surface thereof, are immediately evaporated.

I have found that the charge may be thoroughly dried by the described method, in about one quarter of a minute, when the charge is about one-eighth of an inch thick before the final pressure, and that the charge may be allowed to remain under pressure between the heated forming dies as long as two minutes without being burned or scorched.

After the drying pressure on a charge one-eighth of an inch thick, the finished article is about one-sixteenth of an inch thick, and has such density that it will not subsequently shrink and depart from the predetermined form caused by the dies.

The molding dies and finishing dies shown in this instance, are formed to produce a dish or plate, such as a pie plate. I am not limited, however, to this form, and may form the dies to produce other articles, not necessarily of relatively small area, and not having the parallel top and bottom sides which characterize a pie plate. Articles such as large sheets of cardboard of uniform thickness, and other articles, the major surfaces of which are not parallel with each other, may be produced by the described method and by suitable modifications of the form of the molding and forming or finishing dies.

I will now describe the mechanism whereby the molded charge is transferred from the molding dies to the forming dies, and the mechanism whereby the finished article is removed from the forming dies and exposed to the atmosphere.

120 designates a foraminous pick-off die, preferably of perforated sheet metal and complemental to the lower surface of a charge 7, held by suction on the upper molding die 4. The die 120 (Figures 3 and 5) constitutes one side of a suction space 121, formed in part by portions of a tubular air-conducting suction arm 122 (Figure 5), which is movable to cause the pick-off die 120 to engage the charge in the mold 4, then depress the charge to clear the upper molding die, as shown in broken lines in Figure 3, then swing the charge to position over the lower forming die 74, when the latter is depressed, and at the same time, invert the charge preparatory to depositing it on the die 74, as indicated by Figure 3, the charge being thus located in position to drop upon the lower forming die, and then withdraw from between the lower and upper forming dies, so that the charge may be pressed between the forming or finishing dies, the mechanism causing these movements being as next described.

The suction arm 122 is journaled to turn in a hollow bearing 123, having a tubular stem 124 (Figure 5), adapted to turn in a fixed bearing formed by the upper end of a tubular standard 125, the lower end of which is attached to the base 1. The hollow bearing 123 is fixed to the upper end of a rocking frame 126, adapted to turn and reciprocate vertically on the standard 125. With the lower end of the frame 126 are engaged at 127 (Figure 5) the forks of a bell-crank lever 128, fulcrumed at 129 on the base, and moved in one direction to raise the frame 126.

In Figures 1 and 5 I have shown means for this purpose, including a path cam 130, secured to the shaft 80, which is engaged by the roll 131, journaled on a stud projecting from the lever 132, which rocks on a shaft 133, supported in standards 134, 135. To an extension 136 of this lever 132, is swivelled one end of the pitman 137, the other end of which is swivelled at 138 to the lever end of the forked bell-crank 128.

The path in the cam is formed to operate through the intermediate connections on the frame 126 to function in coordination with the other parts of the combined machine.

The frame 126 is depressed by a spring 139 (Figure 5) interposed between a collar 140, fixed to the standard 125 and a collar 141, fixed to the frame 126 and slidable on the standard.

Vertical movements are thus imparted to the pick-off die.

The frame 126 is rocked on the standard 105, to swing the pick-off die between the molding dies and the forming dies, by a path cam 142 (Figure 1) on the drive shaft 80, and connections between said cam and the hollow bearing 123 (Figures 1 and 5), said connections including a terminal member 143 having a trundle-roll 144 bearing in the cam path, a rack 145, a pitman 147, swivelled at its opposite ends in the member 143 and the rack 145, and a gear segment 146, integral with the frame 126, and with which the rack meshes.

As the shaft 80 rotates, the rack 145 is reciprocated in the bearing 149, which extends from the standard 150, and through the gear segment 146 operates to impart a rocking motion to the frame 126, together with the hollow bearing 123.

In the position of the suction arm 122 shown in the drawings, a pressed article has been deposited and the arm is about to swing to the position for picking off another pressed article from the molding die 4. As it swings to this position, it is reversed by means of a pinion 151, rigid with the shank 152 of the suction arm, engaging the segment 153, supported by the shelf 154 extending from the standard 150.

When the suction arm has completed this movement, the axis of the pick-off die 120 is coincident with the axis of the upper forming die 4, and as the frame 126 is raised, as above described, the pick-off die 120 engages the molded charge 7 on the die 4. As the frame 126 rises, the pinion 151 is separated from the segment 153, and to prevent accidental misplacement of the pick-off die 120, and consequent marring of the molded charge, I have provided (Figure 8) a stop 156 projecting from the hollow bearing 123, and a stud 157, projecting from the shank 152 near its outer end. When the picker arm reaches the pick-off position the stud 157 engages the stop 156. To maintain this contact as the pinion separates from the segment, I provide the coil spring 158, one end of which is secured to the stud 157, and the other to the hollow bearing at 160. Figure 8 shows the pick-off in discharge position, and as the pick-off arm descends with the charge 7, the pinion 151 again meshes with the rack 153, and as it rocks to discharging position, the die 120 is again reversed to discharge the charge 7, over one of the drying elements, as shown in Figure 3, and the spring 158 is wound on the shank 152, the stud 157 rotating to position shown in Figure 8, and the tension of the spring 158 operating in the direction of the arrow.

Before the pick-off die 120 moves from its charge-engaging position shown by Figure 3, in broken lines, the valve 44 is closed to interrupt the suction in the suction space 23 of the upper die, so that the charge is released. At the same time, suction is created in the suction space 121, associated with the pick-off die by means next described, so that the charge is held by suction on the pick-off die while the latter is transferring and inverting the charge, the suction being interrupted when the pick-off die is in position to deliver the inverted charge to the lower forming die. The suction arm 122, the hollow bearing 123, and the tubular standard, constitute portions of an exhaust conduit, another portion 161 of which (shown in part by Figures 1 and 4) communicates with the suction fan or air exhauster 21. The shank portion 152 of the suction arm 122 within the hollow bearing is provided with air ports 162 (Figure 5), permitting air to pass from the suction arm to the interior of the bearing 123.

Within the exhaust conduit is a valve 163 (Figures 5 and 7), adapted to be opened and closed on a seat 164, by mechanism including a cam 165 (Figure 1) on the drive shaft, and connections between the cam and the stem 166 of the valve, including a member 167 (Figures 1 and 5), having a trundle-roll 168 bearing on the cam, and a bell-crank arm 169 (Figure 7), engaged with the stem of the valve 166.

Connection is made between the member 167 and the arm 170, of the bell-crank by means of the pitman 171, swivelled thereto. The bell-crank is rocked on a shaft 172 supported in standard 173, secured to the base 1. These standards as shown, provide support as well for the shaft 129, serving as a fulcrum for the forked bell-crank 128 previously described.

Said mechanism is timed to hold the valve open while the picker-die 120 is transferring the charge from the molding dies to the lower forming die, so that the charge is held by suction on the picker-die, and to close the valve when the charge is in position for delivery to the lower forming die, so that the charge is released, the spring 166a serving to maintain the valve stem 166 in yielding contact with the arm 169 of the bell-crank.

The completed article may be removed from the lower forming die when the latter is depressed, by a suction arm 174, the construction and operating mechanism of which may be substantially as above described, with reference to the suction arm 122, the suction due to the arm 174 being adapted to pick up a finished article from the depressed lower forming die and drop it on a turn-table 175, without reversal of the suction die.

In Figures 1 and 6, I have indicated similar connections to those described as referring to suction arm 122, the variation in details being obviously required, on account of the relative positions of the suction units.

I do not confine myself to this construction in this particular suction unit, and especially as regards the rocking of the arm to transfer the finished article from the drying unit to the turn-table. This operation may be performed by means of radial projections from the rotating spider 77, adapted to engage an arm extending from the rocking frame supporting the suction arm 174, the parts being proportioned to rock the device through the required arc, against the yielding tension of means for returning the suction arm to pickup position. This method is not shown in the drawings as the means shown is the preferred means.

As the spider 77 carrying the drying units is rotating constantly, it is necessary to provide means whereby the suction form 176 may descend and engage the finished article, and withdraw it from its mold. This requires an appreciable time, during which the particular mold is moved in its rotative path and the distance between its axis and the axis of the standard 177 on which picker arm 174 is rocked varies. To compensate for this variation, I provide that the shank portion 178 of the picker arm be made slidable in the hollow bearing 179.

When out of engagement with a drying mold the arm is held in a normal position by means of the spring 180, acting between the end of the bearing 178 and a collar 181, secured to the outer end of the shank portion 178, and serving to maintain a yielding contact between the collar 182 secured to the shank, and the other end of the bearing 179.

As the arm is rocked to position to engage the finished article in the mold, the downward movement is so timed that the suction form 176 is depressed into the mold; and in the interval before it is withdrawn, carrying the finished article, it moves with the mold, the shank portion 178 sliding in the hollow bearing 179, against the yielding pressure of the spring 180. As the arm rises above the mold the arm regains its normal position, and is rocked to discharge the finished article.

The turn-table 175 may be rotated by hand, as the articles are removed therefrom, or it may be rotated by any suitable mechanism to move the dropped articles progressively in a circular path for removal and packing, the article being dropped while it is heated, so that any moisture remaining on the surface thereof is quickly evaporated.

The application on which said original patent was granted is a continuation in part of my application entitled Apparatus for making pulp articles, filed April 3, 1926, Serial No. 99,467.

I claim:

1. That improvement in the method of making articles from pulp, which consists in pressing a charge of pulp to mold the same to approximately its final form, and express water from its opposite sides and passing two induced currents of free air, one over all portions of one side of the charge and the other over all portions of the opposite side while the charge is under pressure, to evaporate and remove the expressed water from both sides of the charge.

2. That improvement in the method of making articles from pulp, which consists in pressing a charge of pulp to mold the same to approximately its final form and express water therefrom, passing currents of air over the major surfaces of the charge, while it is under pressure, to evaporate and remove the expressed water, again pressing the charge and heating it while under pressure, to impart thereto its final form and convert residual water in the charge into steam, permitting the escape of steam from the charge in one direction only, so that rupture of the charge by the escaping steam is prevented, and continuing the pressure while the steam is escaping, to close the voids formed within the charge by the conversion of residual water into steam.

3. That improvement in the method of making articles from pulp, which consists in pressing a charge of pulp to mold the same to approximately its final form and express water therefrom, passing currents of air over the major surfaces of the charge, while it is under pressure, to evaporate and remove the expressed water, again pressing the charge and heating it while under pressure, to impart thereto its final form and convert residual water in the charge into steam, permitting the escape of steam from the charge in one direction only, so that rupture of the charge by the escaping steam is prevented, continuing the pressure while the steam is escaping to close the voids formed within the charge by the conversion of residual water into steam, and finally releasing the charge from pressure and exposing it to the atmosphere, while the charge is heated, to cause evaporation of any remaining moisture.

4. That improvement in the method of making articles from pulp, which consists in pressing a charge of pulp between foraminous molding dies to mold the charge to approximately its final form, and express water therefrom, continuously admitting two currents of air at atmospheric pressure to the outer sides of the dies, and causing an induced flow of the admitted air currents across the said sides, while the charge is under pressure, to evaporate and remove the expressed water.

5. That improvement in the method of making articles from pulp, which consists in pressing a charge of pulp between foraminous molding dies to mold the charge to approximately its final form, and express water therefrom, passing currents of air across the outer surfaces of the dies, while the charge is under pressure, to evaporate and remove the expressed water, again pressing the molded charge between a heated imperforate forming die and a foraminous forming die, to impart to the charge its final form and convert residual water in the charge into steam, while the charge is under pressure, permitting the steam to escape through the foraminous die, and continuing the pressure while the steam is escaping, to close the voids formed in the charge by the conversion of the residual water into steam.

6. That improvement in the method of making articles from pulp, which consists in pressing a charge of pulp between foraminous molding dies to mold the charge to approximately its final form, and express water therefrom, passing currents of air across the outer surfaces of the dies, while the charge is under pressure, to evaporate and remove the expressed water, again pressing the molded charge between an imperforate forming die and a foraminous forming die, to impart to the charge its final form, simultaneously heating the forming dies, to quickly convert residual water in the charge into steam, while the charge is under pressure, permitting the escape of steam through the foraminous forming die and continuing the pressure while the steam is escaping, to close the voids formed in the charge by the conversion of residual water into steam.

7. That improvement in the method of making articles from pulp, which consists in pressing a charge of pulp between foraminous molding dies to mold the charge to approximately its final form, and express water therefrom, passing currents of air across the outer surfaces of the dies, while the charge is under pressure, to evaporate and remove the expressed water, again pressing the molded charge between a heated imperforate forming die, having a polished forming face, and a foraminous forming die, to impart to the charge its final form, glaze the side of the charge contacting with the polished face, and convert residual water in the charge into steam, while the charge is under pressure, permitting the escape of steam through the foraminous die, and continuing the pressure while the steam is escaping, to close the voids formed in the charge by the conversion of residual water into steam.

8. A machine for making articles from pulp, comprising complemental foraminous molding dies formed to press a charge of pulp to approximately its final form, and express water therefrom into and through the dies, power mechanism for causing the coaction of said dies, and an air-conducting system including two air conduits having upper and lower suction spaces associated with the outer surfaces of the dies and provided with intake portions continuously open to the atmosphere and exhaust portions communicating with a suction device whereby two induced currents of free air may be maintained through the intake and suction spaces and across the outer surfaces of the dies, to evaporate and remove the expressed water, while the charge is under pressure between the dies.

9. A machine for making articles from pulp, comprising complemental foraminous molding dies formed to press a charge of pulp to approximately its final form, and express water therefrom into and through the dies, means for charging said dies with pulp, power mechanism for causing the coaction of said dies, an air-conducting system independent of the charging measures adapted to induce currents of free air over the outer surfaces of the dies, to evaporate and remove the expressed water, while the charge is under pressure between the dies, said system including an air exhauster and two air conduits, each communicating at one end with the atmosphere, and at the opposite end with the exhauster, said conduits including suction spaces associated with said dies, and formed in part by surfaces thereof, valves controlling said system, and valve-operating means, actuated by said power mechanism, to open and close said valves, each valve being closed while the other is opened, the arrangement being such that when one valve is closed, the charge is caused by suction to adhere to one of the dies.

10. A machine for making articles from pulp, comprising complemental foraminous molding dies, formed to press a charge of pulp to approximately its final form, and express water therefrom into and through the dies, power mechanism for causing the coaction of said dies, complemental forming dies located adjacent to the molding dies, and formed to press the molded charge to its final form, said forming dies including an imperforate heated die and a foraminous die having a steam space at its outer side open to the atmosphere, means for transferring the molded charge from the molding dies to the forming dies, power mechanism for causing the coaction in the forming dies, to convert residual water in the charge into steam, while the charge is under pressure, the imperforate forming die preventing the escape of steam from the charge in one direction, while the foraminous die permits the escape of steam in the opposite direction through said steam space to the atmosphere, said power mechanism being adapted to exert a continuing pressure through the forming dies on the charge while the steam is escaping, and thereby close the voids formed within the charge by the conversion of the residual water into steam.

11. A machine for making articles from pulp comprising molding means adapted to form a charge of pulp to an approximation of the prescribed form of the finished article, complemental forming dies, one of which has a substantially impervious pulp engaging face, and the other of which has provisions in its article engaging portion for conducting away water, a transferrer for carrying articles from said molding means to the forming dies, means for effecting such movements of relative approach and recession between the complemental molding dies as to compress and release the article placed between them, and heating means in association with said impervious die adapted to heat the article engaging face thereof, to a temperature substantially higher than the boiling point of water.

12. A machine for making articles from pulp, comprising complemental foraminous molding dies, formed to press a charge of pulp to approximately its final form, and express water therefrom into and through the dies, power mechanism for causing the coaction of said dies, complemental forming dies located adjacent to the molding dies, and formed to press the molded charge to its final form, said forming dies including an imperforate heated die and a foraminous die having a steam space at its outer side open to the atmosphere, means for transferring the molded charge from the molding dies to the forming dies, power mechanism for causing the coaction of the forming dies to convert residual water in the charge into steam, while the charge is under pressure, the imperforate forming die preventing the escape of steam from the charge in one direction, while the foraminous die permits the escape of steam in the opposite direction through said steam space to the atmosphere, said power mechanism being adapted to exert a continuing pressure through the forming dies on the charge while the steam is escaping, and thereby close the voids formed within the charge by the conversion of the residual water into steam, the imperforate heated forming die having a polished forming face adapted to impart a glazed surface to one side of the charge.

13. A machine for making articles from pulp, comprising complemental foraminous molding dies, formed to press a charge of pulp to approximately its final form, and express water therefrom into and through the dies, power mechanism for causing the coaction of said dies, complemental forming dies located adjacent to the molding dies, and formed to press the molded charge to its final form, said forming dies including an imperforate heated die and a foraminous die having a steam space at its outer side open to the atmosphere, means for transferring the molded charge from the molding dies to the forming dies, power mechanism for causing the coaction of the forming dies, to convert residual water in the charge into steam, while the charge is under pressure, a table located adjacent to the forming dies, and means for transferring the completed article from the forming dies to the table while the article is heated, the transferred article being exposed to the atmosphere and resting loosely while on the table, so that any remaining moisture is quickly evaporated therefrom.

14. A machine for making pulp articles, comprising an upper molding die, a holder therefor, a lower molding die having a charge-segregating member, a carrier for the lower die, said dies being foraminous, an annular reservoir adapted to hold a body of pulp between the dies when they are separated, power mechanism for moving the carrier to cause the lower die to segregate a charge of pulp from the body and coact with the upper die to mold the charge and express water therefrom into the openings in the dies, an air-conducting system including suction spaces formed in part by the outer sides of the dies, and an air-exhauster for inducing evaporating air currents in said system across and away from the outer sides of the dies.

15. A machine for making pulp articles as specified by claim 14, said air-circulating system including an exhaust conduit having an intake portion open to the atmosphere at the margin of the suction space of the upper die, and extending from said space to the exhauster, and a combined intake and exhaust conduit, comprising an intake portion open to the atmosphere and communicating with the suction space of the lower die, and an exhaust portion extending from said space to the exhauster.

16. A machine for making pulp articles as specified by claim 14, said air-circulating system including an exhaust conduit having an intake portion open to the atmosphere at the margin of the suction space of the upper die, and extending from said space to the exhauster, and a combined intake and exhaust conduit, comprising an intake portion open to the atmosphere and communicating with the suction space of the lower die, and an exhaust portion extending from said space to the exhauster, the cross-sectional area of the intake portion at the suction space of the upper die being less than that of the corresponding exhaust portion, so that the molded charge may be held by suction against the upper die.

17. A machine for making pulp articles, comprising an upper molding die, a holder therefor, a lower molding die, a carrier therefor, power mechanism for causing the coaction of said dies, an air-conducting system including suction spaces formed in part by the outer sides of the dies, and an air-exhauster for inducing evaporating currents of air in said system across and away from the outer sides of the dies, each of said dies comprising two superimposed layers, one of perforated sheet metal, forming the outer side of the die, and the other of wire gauze, forming the inner side of the die, and spaced apart braces seated in said suction spaces and distributing on the dies the pressure exerted by said power mechanism.

18. A machine for making pulp articles, comprising an upper molding die, a holder therefor, a lower molding die, having a charge-segregating member, a carrier for the lower die, said dies being foraminous, an annular reservoir adapted to hold a body of pulp between the dies when they are separated, power mechanism for moving the carrier to cause the lower die to segregate a charge of pulp from the body and coact with the upper die to mold the charge and express water therefrom into the openings in the dies, an air-circulating system including suction spaces formed in part by the outer sides of the dies, an air-exhauster adapted to induce evaporating currents of air in said system across and away from the outer sides of the dies, said system including an upper exhaust conduit having an intake portion, open to the atmosphere at the suction space of the upper die, and extending from said space to the exhauster, and a lower conduit comprising an intake portion, open to the atmosphere, and communicating with the suction space of the lower die, and an exhaust portion extending from the last-mentioned space to the exhauster, a valve in the upper exhaust conduit, a valve in the intake portion of the lower conduit, and means for closing and opening said valves alternately, the upper conduit valve being opened when the lower conduit valve is closed.

19. A machine for making pulp articles, comprising an upper molding die, a holder therefor, a lower molding die, having a charge-segregating member, a carrier for the lower die, said dies being foraminous, an annular reservoir adapted to hold a body of pulp between the dies when they are separated, power mechanism for moving the carrier to cause the lower die to segregate a charge of pulp from the body and coact with the upper die to mold the charge and express water therefrom into the openings in the dies, an air-conducting system including suction spaces formed in part by the outer sides of the dies, and an air-exhauster for inducing evaporating air currents in said system across and away from the outer sides of the dies, the machine comprising also a fixed guide in which the upper die holder has a limited yielding movement, and means exerting on said holder a yielding pressure opposed to the pressure exerted by the power mechanism, so that the dies are conformable to, and adapted to press charges of different thickness.

20. A machine for making pulp articles comprising an upper molding die, a holder therefor, a lower molding die having a charge-segregating member, a carrier for the lower die, said dies being foraminous, an annular reservoir adapted to hold a body of pulp between the dies when they are separated, power mechanism for moving the carrier to cause the lower die to segregate a charge of pulp from the body and coact with the upper die to mold the charge and express water therefrom into the openings in the dies, an air-conducting system including suction spaces formed in part by the outer sides of the dies, and an air-exhauster for inducing evaporating air currents in said system across and away from the outer sides of the dies, the machine comprising also a fixed guide in which the upper die-holder has a limited yielding movement, a fulcrum on said guide and a weighted lever engaged with the fulcrum and bearing on the die-holder to exert thereon a yielding pressure opposed to the pressure exerted by the power mechanism, the weight of said lever being adjustable relative to the fulcrum, to vary the yielding pressure.

21. A machine for making pulp articles as specified by claim 20, comprising also an adjustable stop limiting the pressing action of the lever on the die-holder, and permitting variation of the thickness of the molded charge.

22. A machine for making articles from pulp, comprising complemental foraminous molding dies, formed to press a charge of pulp to approximately its final form, and express water therefrom through the dies, power mechanism for causing the coaction of said dies, a vertical shaft rotatable in fixed bearings adjacent to the molding dies, means for continuously rotating said shaft, upper and lower carriers fixed to the shaft, a circular series of imperforate heated upper forming dies, fixed to the upper carrier, a circular series of foraminous lower forming dies, fixed to rods which are vertically movable in the lower carrier, the upper and lower forming dies being continuously moved in unison in circular paths, means confining the upper forming dies against vertical movement, means actuated by the rotation of the shaft to depress one of the lower forming dies at a given point in its circular path, the other lower forming dies being raised, and one of the upper forming dies exposed, a pick-off mechanism organized to engage a formed charge on the upper molding die and transfer the charge to the exposed lower forming die, said mechanism including a foraminous carrying suction die complemental to a formed charge, means for alternately exhausting air from the suction die, to cause it to hold the charge, and admitting air to the suction die to cause it to liberate the charge, and means for moving the suction die to cause it to engage a charge on the upper molding die, invert the charge and deposit it on the lowered forming die, the machine comprising also means for heating the forming dies, to convert residual water in the charge into steam which escapes to the atmosphere through the foraminous lower forming dies.

23. The method of making molded articles from subdivided matter in liquid suspension, which consists in molding the article and extracting a portion of the liquid vehicle from the solid matter at the same time, and then placing the article between forming members, one of which is imperforate and is maintained at a temperature substantially higher than the boiling temperature of water at the time of receiving the article and thereafter, while the other is provided with outlet means for escape of liquid and vapor, and compressing the article by said members.

24. The method of producing formed articles from paper pulp which consists in pressing a charge of pulp between molding members with simultaneous expulsion of a portion of the water from such charge, transferring the molded charge to complemental dies, at least one of which is imperforate and is continuously maintained at a temperature substantially above the boiling point of water, and expelling a further quantity of water from the charge by heat while under the confinement of said dies.

25. A pulp molding apparatus comprising associated pairs of molding and forming dies having provision for escape of water, means for delivering pulp between the molding dies, power mechanism for operating said dies to compress a charge of pulp between the molding dies and a molded article between the forming dies, and transferring means for carrying the molded article from the molding dies to the forming dies.

26. A machine for making articles from pulp comprising complemental foraminous molding dies formed to press a charge of pulp to approximately its final form, and express water therefrom through the dies, complemental forming dies adjacent to the molding dies formed to press the molded charge to its final form, power mechanism for causing the coaction of said dies, means for heating said forming dies, and means for transferring the molded charge from the molding dies to the forming dies.

27. A pulp molding apparatus comprising the combination of cooperative dies, certain of which are foraminous and unheated and are adapted to mold charges of wet pulp and express water from them, while others are continuously heated and are adapted to receive and dry wet compressed charges of pulp taken from the molding dies, and automatic means operable in cycle with said dies for transferring the molded charges from the molding dies to the heated dies.

28. A machine for making articles from pulp comprising the combination of molding and drying units with transfer means for carrying charges of molded pulp from the molding unit to the drying unit, means for operating the molding unit to remove mechanically a major proportion of the water from the charge being molded, and means for heating the forming unit to expel additional moisture by thermal action from the molded charge, said forming unit comprising an impervious forming surface coextensive with substantially the entire area at one side of the molded charge, and heating means operable to maintain said surface at a sufficiently high temperature to cause flashing into steam of the water contained in the adjacent part of the molded article upon contact of such article with said forming surface.

29. A machine for making pulp articles comprising in combination means for molding a charge of pulp and removing a portion of the water from such charge, a carrier operably arranged in proximity to said molding means for taking the molded article therefrom and transferring it to another location, complemental dies in the last named location adapted to receive the article from the carrier, means for heating said dies, and automatic means for operating said molding means, carrier and dies, in sequence for the purposes set forth, and for closing the heated dies against the molded article received from the carrier.

30. A machine for making pulp articles comprising molding means adapted to receive and shape pulp into the required article and remove water therefrom, a heated drying die at one side of said molding means having an impervious surface complemental to a surface of the molded article, a cooperative die for confining the article in contact with said heated die and having provisions for discharge of water, transfer means for carrying molded articles from the molding means to a location between said dies, and means for operating the foregoing instrumentalities in timed sequential relation with one another.

31. A machine for making articles from pulp comprising complemental molding dies formed and constructed to press a charge of pulp to approximately its final form and expel water therefrom, complemental forming dies, one of which is imperforate and the other is provided with outlet means for escape of liquid and vapor, formed to press the molded charge to its final form, means for causing the coaction of said dies, means for heating the imperforate forming die, and means for transferring the molded charge from the molding dies to the forming dies.

RALPH W. CHAPMAN.